(12) United States Patent
Kim et al.

(10) Patent No.: US 9,476,990 B2
(45) Date of Patent: Oct. 25, 2016

(54) TRACKING OF OCCLUDED NAVIGATION SATELLITE SIGNALS

(71) Applicant: Mitsubishi Electric Research Laboratories, Inc., Cambridge, MA (US)

(72) Inventors: Kyeong Jin Kim, Lexington, MA (US); Okuary Osechas, Cambridge, MA (US); Andrei Kniazev, Cambridge, MA (US); Kieran Parsons, Cambridge, MA (US); Zafer Sahinoglu, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/574,708

(22) Filed: Dec. 18, 2014

(65) Prior Publication Data
US 2016/0178755 A1 Jun. 23, 2016

(51) Int. Cl.
*G01S 19/48* (2010.01)
*B61C 17/12* (2006.01)
*B61L 1/14* (2006.01)
*G01C 21/20* (2006.01)

(52) U.S. Cl.
CPC ............. *G01S 19/48* (2013.01); *G01C 21/20* (2013.01)

(58) Field of Classification Search
CPC ....... G01S 19/22; G01S 19/48; B61C 17/12; B61L 25/025; B61L 1/14; B61L 29/24; B60L 11/123
USPC .................. 701/19, 468, 1, 408; 342/357.27, 342/357.31; 702/158; 246/125
See application file for complete search history.

(56) References Cited

U.S. PATENT DOCUMENTS

| | | | | |
|---|---|---|---|---|
| 5,699,986 A * | 12/1997 | Welk | ...................... | B61L 29/24 246/122 R |
| 5,886,665 A | 3/1999 | Dosh et al. | | |
| 6,081,769 A * | 6/2000 | Curtis | ...................... | B61L 1/14 246/122 R |
| 7,642,957 B2 * | 1/2010 | Lennen | ................... | G01S 19/22 342/357.27 |
| 8,239,078 B2 * | 8/2012 | Siddappa | ................ | B61C 17/12 455/92 |
| 8,504,218 B2 * | 8/2013 | Mollet | .................. | B60L 11/123 701/1 |
| 2006/0058957 A1 * | 3/2006 | Hickenlooper | ....... | B61L 25/025 701/408 |
| 2009/0248226 A1 * | 10/2009 | Kellner | ................... | B61C 17/12 701/19 |
| 2015/0134156 A1 * | 5/2015 | Henry | ..................... | B61C 17/12 701/19 |

* cited by examiner

*Primary Examiner* — Tuan C. To
*Assistant Examiner* — Yuri Kan
(74) *Attorney, Agent, or Firm* — Gene Vinokur; James McAleenan; Hironori Tsukamoto

(57) ABSTRACT

A navigation system includes a first navigation module for determining a first position and a second navigation module for determining a second position. The first and the second navigation modules are mechanically connected, such that the first position is dependent on the second position. Also, the first and the second navigation modules are communicatively connected to exchange information including at least one of the first and the second positions. At an instant of time during an operation of the navigation system, the first navigation module receives the second position from the second navigation module and determines the first position based on the second position.

17 Claims, 10 Drawing Sheets

TRACKING OF OCCLUDED NAVIGATION SATELLITE SIGNALS

FIELD OF THE INVENTION

This invention relates generally to a global navigation satellite system (GNSS), and more particularly to navigation systems for acquiring and/or tracking satellites signals occluded by environmental factors or manmade structures.

BACKGROUND OF THE INVENTION

A navigation system, such as the global navigation satellite system (GNSS), provides location and time information with line-of-sight (LOS) to four or more navigation satellites. Although four satellites are required for normal operation, fewer are possible in cases where one variable, e.g., elevation is known or irrelevant. The navigation system provides positioning services to a moving vehicle by tracking the satellite signals during the movement of the vehicle. However, the navigation system of the vehicle can lose one or more satellite signals when the LOS with the satellite transmitting the satellite signal is occluded by environmental features, such as trees, buildings, or bridges. After the tracking of the satellite signal is lost, the satellite signal must be reacquired when the LOS with the satellite is restored. The reacquisition of the satellite signal is a time consuming process, because the frequency and phase of the satellite signal to be tracked are varying in response to a change in relative positions and/or velocities between the moving vehicle and the transmitting satellite, and are usually unknown.

Some navigation systems use temporal and spatial diversity to minimize problems with LOS occlusion. For example, the system and method described in U.S. Pat. No. 7,642,957 uses two antennas to receive satellite signal with the expectation that at least one antenna receives a "good" signal. Another system sets up a local constellation, as in U.S. Pat. No. 5,886,665, where dedicated transceivers with known locations rebroadcast the satellite signals into areas with a "poor" signal. However, such a system is expensive to install and maintain and requires dedicated and protected real estate to operate.

If a vehicle is moving at a high speed through an environment littered with features that could occlude the satellite signals, it is possible that the signals can only be received for a time that is shorter than the required acquisition time.

Accordingly, there is a need for a method that speeds up the acquisition time of satellites signals by a navigation system of the moving vehicles.

SUMMARY OF THE INVENTION

In global navigation satellite system (GNSS) applications, satellites signals received by navigation systems are tracked over time in order to provide position estimates. Typically, the navigation system is used by moving objects, such as vehicles, boats, trains and planes. If less than four signals are received, due to occlusion of the one or more of the signals along a line-of-sight (LOS) with the satellites, then a potentially lengthy acquisition process must be performed to reacquire the signal. The acquisition process determines the information required to initialize the tracking process, such as the phase and the frequency of the satellite signal.

Some embodiments of the invention are based on recognition that position and velocity of the navigation system are mutually dependent with the tracking of the satellite signal. This is because the tracking of satellite signal can be used to determine the position and the velocity of the navigation signal, but also the position and the velocity can be used to initiate the tracking. For example, the phase of the satellite signal is a measure of a distance between the navigation system and the satellite, and thus depends on the position of the navigation system, and other parameters that are uniquely defined as a function of time. Also, the frequency of the received satellite signal depends on the velocity of the navigation system due to the Doppler effect, and other parameters that are uniquely defined as a function of time.

Thus, knowing the position and velocity of navigation system, upon reacquiring the signal, provides enough information needed to simplify the acquisition process. However, when the satellite signal is lost, the position and/or velocity of the navigation system at a future time of reacquiring the signal are unknown.

Some embodiments of the invention are based on realization that in a system where geographic information is available, for example in the form of a Geographic Information System (GIS) database, previous position and velocity estimates can be used to yield estimates of the position and velocity at a current time, or even to predict position and velocity in the future. For example, upon losing a signal blocked by a geographical object, the position and/or velocity at the next location where the LOS is restored can be predicted using geographical information (GI) about the properties of that object. For example, when a vehicle enters a tunnel that blocks the satellites signals, the length of the tunnel can be used to predict the position of re-emerging from the tunnel, and the knowledge of that position can be used to initiate the tracking of the satellite signal.

Additionally or alternatively, the navigation system can include multiple navigation modules for determining multiple positions. This is of particular interest for large trains where the distance between the front and rear of the train can exceed 2000 meters. Thus, it is possible to estimate the position and velocity of each navigation module, if the position and velocity of one navigation module is known. For example, if multiple navigation modules are sufficiently separated apart and mechanically connected, e.g., installed at different locations on a train, then position and/or velocity at next the LOS location for a first navigation module can be determined based on current position and/or velocity of a second navigation module, when the second navigation module still has the LOS with the satellite. Such navigation systems enable continuous tracking of the position of the first navigation module when the position can be determined by the second navigation module.

Accordingly, one embodiment of the invention discloses a navigation system including a first navigation module for determining a first position; and a second navigation module for determining a second position, wherein the first and the second navigation modules are mechanically connected, such that the first position is dependent on the second position, wherein the first and the second navigation modules are communicatively connected to exchange information including at least one of the first and the second positions, and wherein, at an instant of time during an operation of the navigation system, the first navigation module receives the second position from the second navigation module and determines the first position based on the second position.

Another embodiment of the invention discloses a method for navigating a vehicle. The method includes tracking, by a first navigation module installed on the vehicle, a set of satellite signals to determine a first position; receiving, upon loosing at least one satellite signal, a second position determined by a second navigation module installed on the vehicle, such that the second navigation module is mechanically connected with the first navigation module through a body of the vehicle; and determining the first position based on a relative distance between the first and the second navigation modules and a velocity of the vehicle.

Yet another embodiment of the invention discloses a navigation system of a train moving on a train rack. The navigation system includes a first navigation module installed on the train for determining a first position of the train; and a second navigation module installed on the train for determining a second position of the train, wherein the first and the second navigation modules are mechanically connected through a body of the train and are communicatively connected to exchange operational information; and a non-transitory memory storing a database with geographical information including information on the train rack, wherein the first and the second navigation modules are configured to determine at least one of the first and the second position using the geographical information and the operational information.

DETAILED DESCRIPTION OF THE PREFERRED EMBODIMENTS

Figure 1:
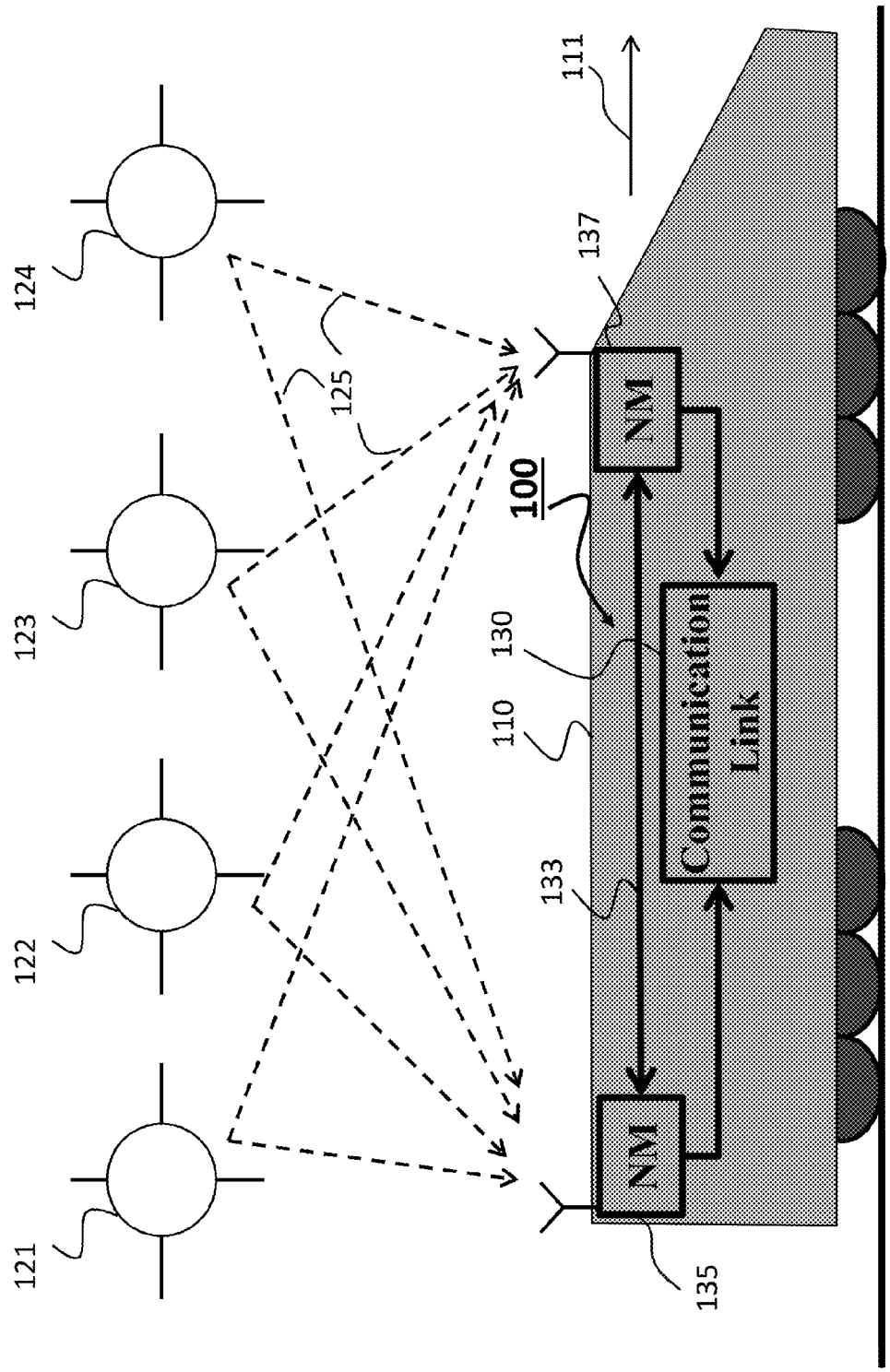
FIG. 1 is a schematic of a train car with a navigation system including multiple navigation modules according to some embodiments of the invention.

FIG. 1 shows a train car 110 employing a navigation system 100 according to some embodiments of the invention. The navigation system 100 includes at least two navigation modules 135 and 137 and a communication link 130.

The first navigation module 135 is for determining a first position, e.g., a position of the first navigation module and/or a position of the train where the first navigation module is arranged. The navigation system 100 also includes a second navigation module 137 for determining a second position, such as a position of the second navigation module. The first 135 and the second 137 navigation modules receive satellites signals, e.g., the signals 125, from at least four navigation satellites, such as satellites 121, 122, 123, and 124. The first and the second navigation modules can determine their respective positions by tracking and interpreting the satellite signals independently of each other.

The first and the second navigation modules are mechanically connected 133 to each other, such that the first position is dependent on the second position. In this embodiment, the first and the second navigation modules are arranged on the train car 110, and thus rigidly connected to each other through the body of the train car. In such a manner, the first and the second navigation modules can have identical velocity, i.e., the velocity of the train car 111. In alternative embodiments, the mechanical connection is not rigid. For example, the modules are arranged individual cars of a train linked by couplers so the train is flexible when traveling along curves. In this case, the distance between the NMs can vary. This scenario is prevalent for track along river valleys or through tunnels where a mountainous terrain necessitates a lot of curves as well as a lot of occlusions.

The first and the second navigation modules are communicatively connected 130 to exchange information including at least one of the first and the second positions. The mechanical and communicative connections allow navigation modules to exchange the information that can facilitate determining the first or the second positions. For example, in some embodiments, at an instant of time during the operation of the navigation system 100, the first navigation module receives the second position from the second navigation module and determines the first position based on the second position. The receiving of the second position allows the first navigation module to continuously track its position even when one or all satellite signals are occluded.

Some embodiments of the invention are based on recognition that position and velocity of the navigation system are mutually dependent with the tracking of the satellite signal. This is because the tracking of satellite signal can be used to determine the position and the velocity of the navigation signal, but also the position and the velocity can be used to initiate the tracking. For example, the phase of the satellite signal is depends on a distance between the navigation module and the satellite, and thus depends on the position of the navigation module, and other parameters that are uniquely defined as a function of time. Also, the frequency of the satellite signal depends on the velocity of the navigation module, and other parameters that are uniquely defined as a function of time.

Thus, knowing the position and velocity of a navigation module upon reacquiring the signal along the line-of-sight (LOS) with the satellite at an instant of time, provides enough information to simplify the acquisition process. Accordingly, in some embodiments of the invention, e.g., in the case of any of the signal becomes occluded for the first navigation module 135, the information received from the second navigation module 137 can include one or combination of up-to-date estimates on the frequency and phase of the occluded satellite signal, and/or position and velocity of the second navigation module 137, which yields estimates about the position and velocity of the first navigation module 135. Additionally or alternatively, in the navigation system 100, the control variables of the tracking in one navigation module can be passed directly into upon detecting the re-appearance of the occluded signal in another navigation module.

Figure 2:
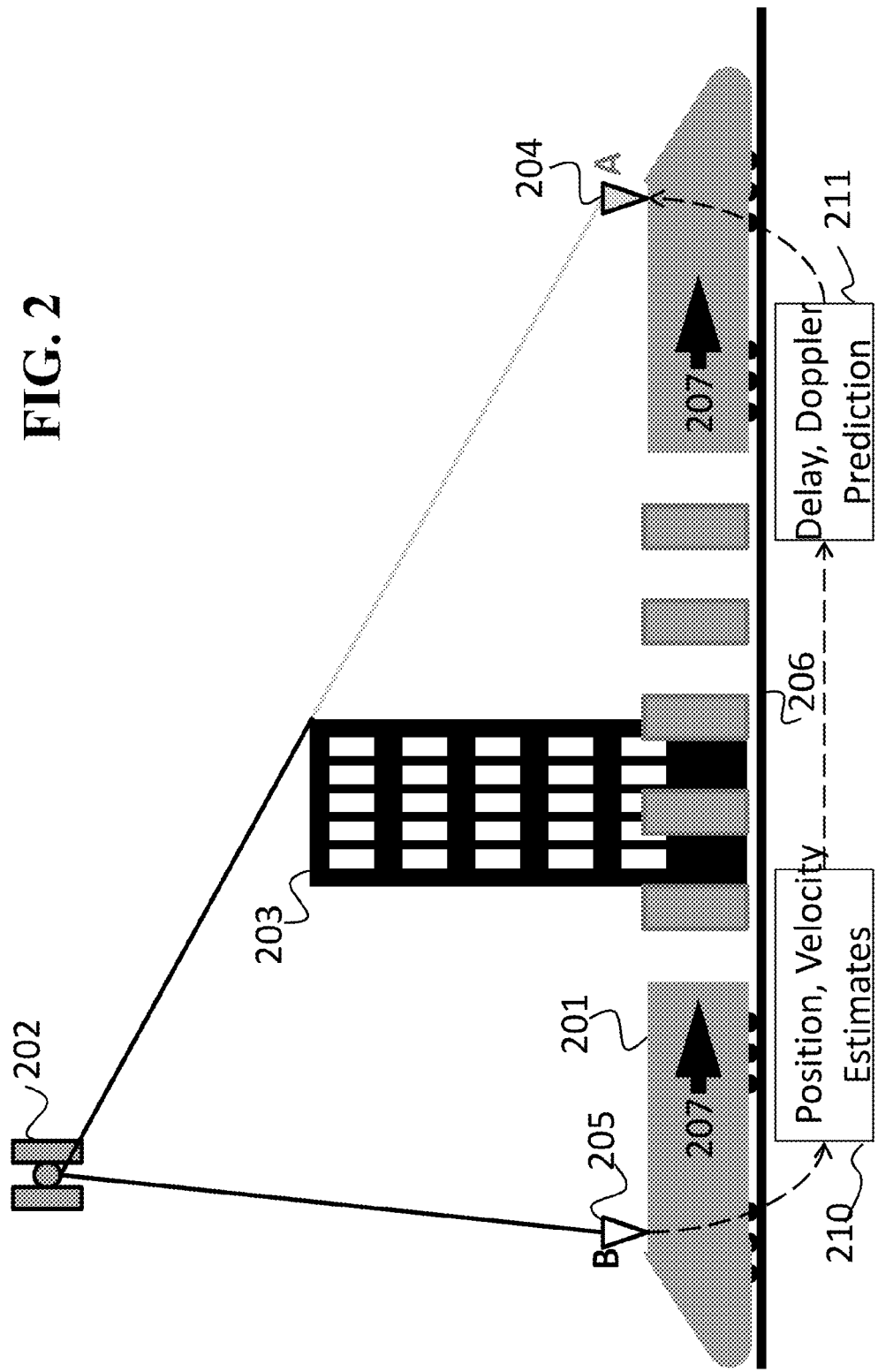
FIG. 2 is a side view of a train in an urban environment, equipped with multiple navigation modules according to some embodiments of the invention.

FIG. 2 shows an example of a train 201, travelling in the direction of the arrow 207 and equipped with two navigation modules 204 and 205. In this example, the signal from the satellite 202 is occluded by an obstacle 203, denying the navigation module 204 to determine a position estimate. If the navigation module 205 is able to compute a position and a velocity estimate 210, then this estimate can be propagated to the module 204 allowing the module 204 to determine its current position and/or initial values 211 for the frequency and phase required to re-start signal tracking.

In this embodiment, the navigation modules 204 and 205 are mechanically, but not rigidly, connected. In the particular case of a straight track 206 between 204 and 205, the velocities of the navigation modules are substantially identical the difference between the first and the second positions is fixed distance along the train. Synchronization between the clocks of the navigation modules can be achieved using wireless methods, which in turn requires clocks with good short-term stability, such as a rubidium clock might provide.

In one embodiment of the invention, the first navigation module, e.g., the module 204, determines its first velocity and determines the first position based on the first velocity and the second position. For example, the first navigation module can determine the first position using a relative distance between the first and the second navigation modules extended in the direction defined by the velocity of the first or the second navigation modules. In one embodiment of the invention, the first navigation module receives a second velocity from the second navigation module and determines the first velocity using the second velocity. In the alternative embodiment, the first navigation module receives the first velocity from any other velocity measurement system capable of determining the first velocity. For example, the first navigation module can receive the first velocity from a velocity measurement system rigidly connected with the first navigation module.

Figure 3:
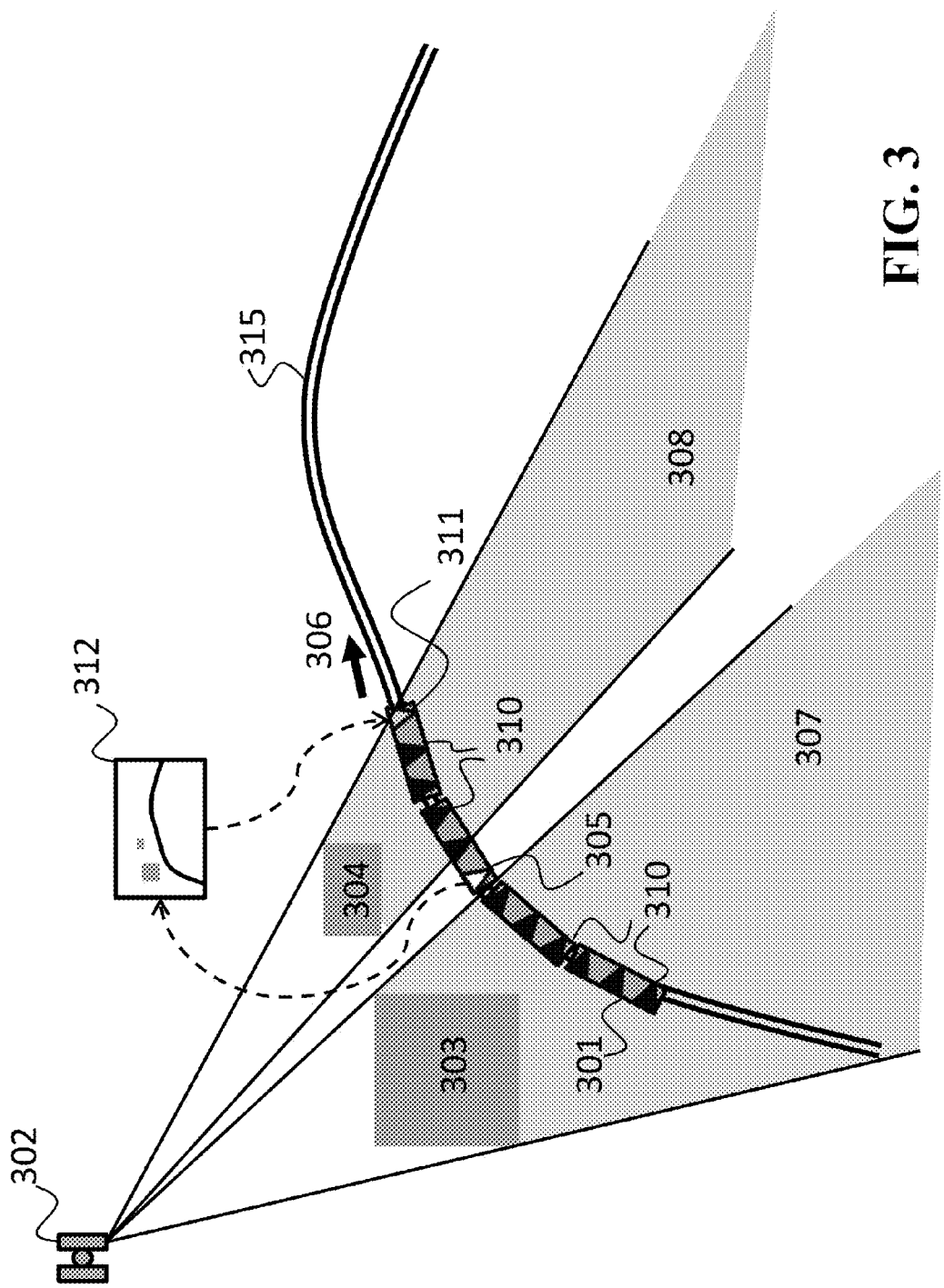
FIG. 3 is a top view of a train, travelling in an urban environment, employing multiple navigation modules according to some embodiments of the invention.

FIG. 3 shows another embodiment with a train 301 with multiple navigation modules and a navigation satellite 302. Buildings 303 and 304 block the view of the satellite from the shaded areas 307 and 308, respectively. Thus, signals for the modules 310 are occluded, potentially leaving them unable to determine positions. A gap between the buildings allows at least one module 305 to have a line-of-sight to the satellite 302, potentially enabling the module 305 to determine a position, if the signal can be acquired quickly enough. The module 311 is about to emerge from the shaded area to be able to track the signals from the satellite 302.

In this embodiment, the position and velocity information supplied by module 305 is processed using a digital map or a geographic information system (GIS) 312 to estimate the position and velocity of module 311. This estimation enables the navigation module 311 to acquire the signal as soon as the signal becomes available, rather than having to go through a lengthy conventional acquisition process. The GIS 312 can include geographic information about curvatures of the rails 315, which allows adjusting the relative distance between the modules using the geographic information.

In this embodiment, the tracking of the satellite signals with different navigation modules can be used in a collaborative way. Tracking different ranging measurements to different satellites at various different points along the train, a position can be determined. This holds true, even if no single navigation module tracks enough satellites to autonomously determine a position.

Furthermore, geographic information allows navigation modules arranged on different train cars to detect the appearance of multipath errors by computing expected navigation measurements at the leading module from information relating to the following modules and comparing the information against the actually received signals. Also, the embodiment provides signal tracking during complete outages of the navigation signal on all navigation modules, leveraging information from navigation modules, the GIS, and inertial or velocity sensors.

A further embodiment of the invention provides the ability to acquire signals subject to radio frequency interference (RFI). The difficulty of acquiring navigation signals subject to RFI with conventional methods lies in the increased noise, or a decreased signal to noise ratio (SNR). Increased noise can potentially lead to a misidentifying the frequency and phase of the signal. When an alternative method is available to estimate the signal frequency and code phase, then the signal tracking is more likely to track the correct frequency and phase.

Figure 4:
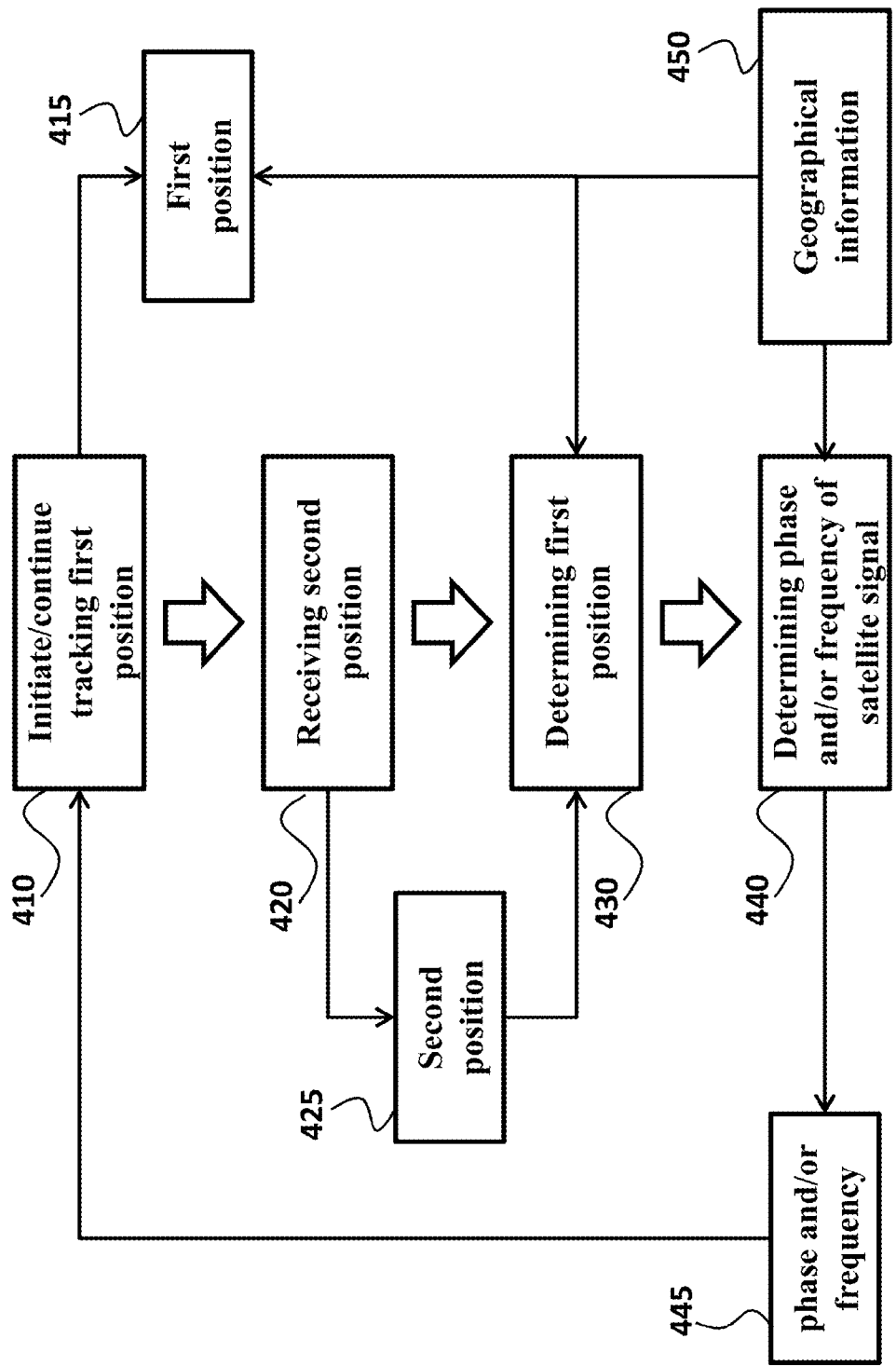
FIG. 4 is a block diagram of a method for navigating a vehicle according to some embodiments of the invention.

FIG. 4 shows a block diagram of a method for navigating a vehicle according to some embodiments of the invention. The first navigation module installed on the vehicle is continuously or periodically tracking 410 a set of satellite signals to determine a first position 415. At some instance of time during the operation of the method, e.g., upon loosing at least one satellite signal, the first navigation module receives 420 a second position 425 determined by a second navigation module installed on the vehicle. In this embodiment, the second navigation module is mechanically connected with the first navigation module through a body of the vehicle, such as a train as in FIG. 1-3. Next, the first navigation module determines 430 the first position 415 based on a relative distance between the first and the second navigation modules and a velocity of the vehicle. The steps of the method can be performed using at least a processor of the first navigation module.

In some embodiments, the method uses the first position to determine 440 the phase and/or the frequency 445 of the satellite signal to be tracked, and initializes the tracking of the satellite signal according to the frequency and the phase of the satellite signal. In some embodiments, the method uses a database 450 with geographical information including information geographic information related to the train rack to aid in the determination of the first position.

Figure 5A:
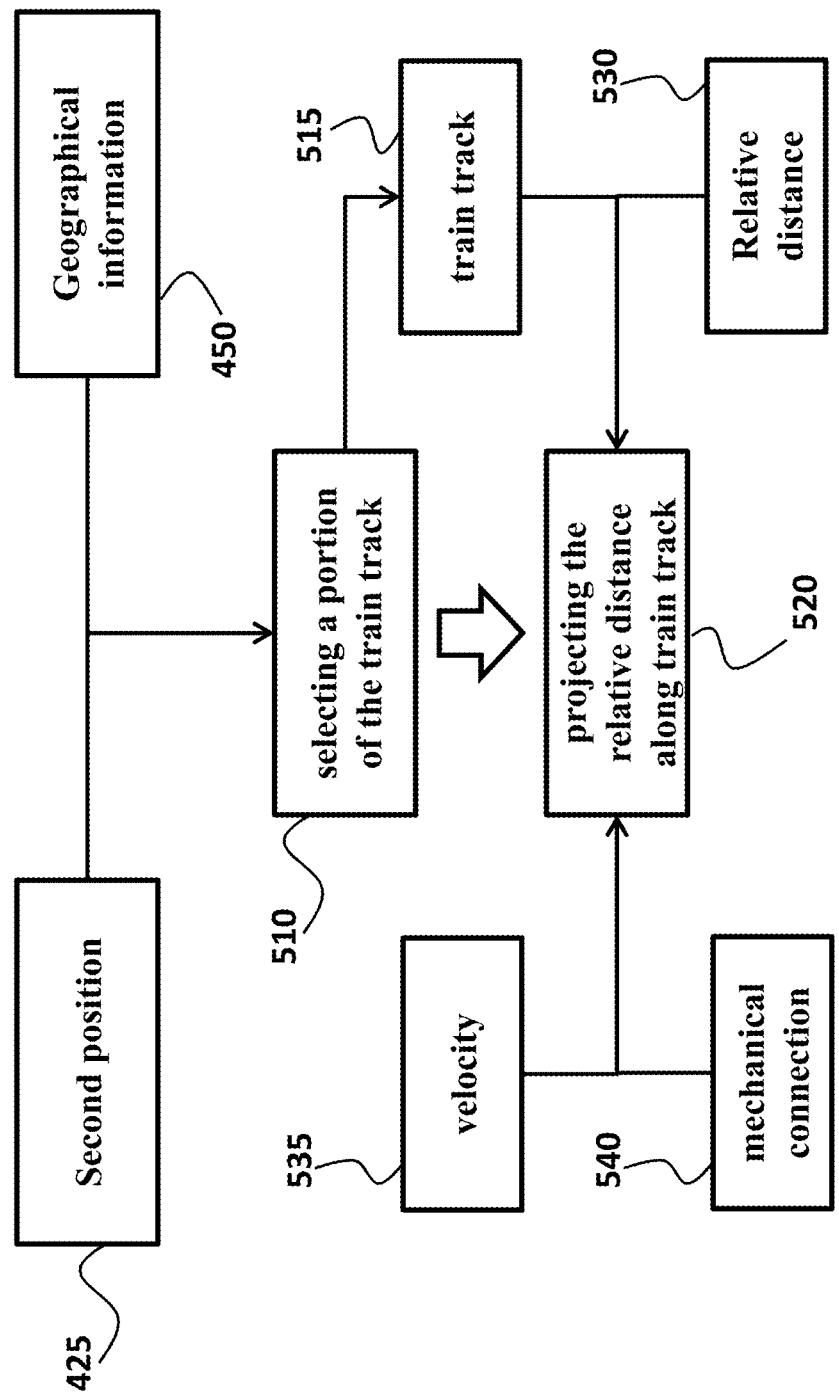
FIG. 5A is a block diagram of a method for determining the position using geographical information database according to one embodiment of the invention.

FIG. 5A shows a block diagram of a method for determining the first position using the database 450 according to one embodiment of the invention. The embodiment select 510 a portion of the train track including the second position 425 from a database with geographical information 450 and determines the first position by projecting 520 the relative distance 530 between the first and the second navigation modules along the portion of the train track starting from the second position 425 into a direction of the velocity 535 train. The velocity of the train can be determined independently or received from the second navigation module. In some embodiments, the relative distance is adjusted using information about the couplers between the cars of the train. For example, one embodiment measures the angles between the cars of the train and multiplies the distance between the receivers by the cosines of all the angles between the cars that lie between the two GNSS modules.

Figure 5C:
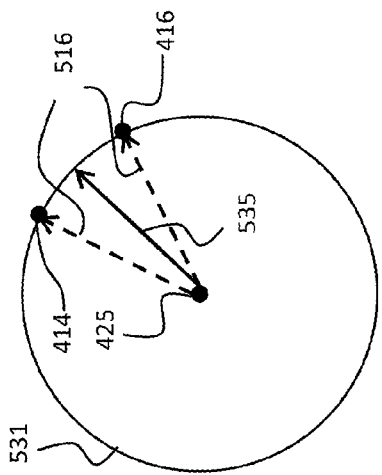
FIGS. 5B, 5C, 5D and 5E are schematics of determining the position based on relative distance between navigation modules according to various embodiments of the invention.
Figure 5E:
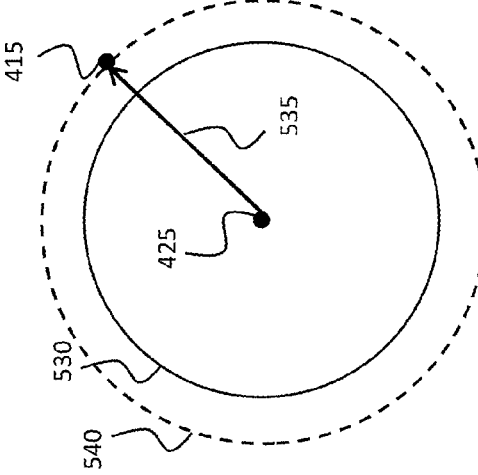
Figure 5B:
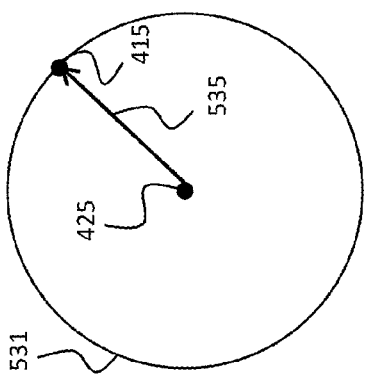

FIG. 5B shows a schematic of determining the first position 415 based on the second position 425 and the relative distance 530 between the first and the second navigation modules forming a circle 531 around the second distance, i.e., the first distance can be on any point of the circle 531. In this example, the first position 415 is selected on the circle 531 according to a direction of the velocity 535.

FIG. 5C shows a schematic of an embodiment considering the first position between the positions 414 and 416 determined based on a maximal potential curvature of the train rack 515. In this embodiment, the phase of the satellite signal can be determined for different locations.

Figure 5D:
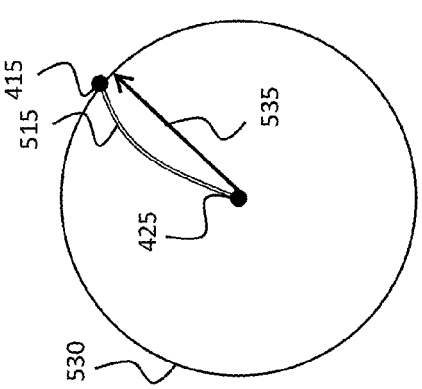

FIG. 5D shows a schematic of an embodiment considering the geographical information. In this embodiment the first position 415 is selected on an intersection of the circle 531 with a portion of the train track 515.

FIG. 5D shows a schematic of an embodiment considering mechanical connection between the cars of the train. In this embodiment the circle 530 can be decreased or increased 540 to reflect that the connection between the navigation modules is not rigid.

The embodiment enables one navigation module to reacquire the navigation signal using the information provided by other navigation modules on the same train. For example, the phase $\hat{\Phi}$ of the satellite signal at the reacquiring navigation module $\hat{\Phi}$, located at position $x_A$, can be determined from the phase) $\Phi_B$ of the satellite signal determined at the known position $x_B$ according to $$\hat{\Phi} = \left[\frac{1}{c}[\Phi_B + (x_A - x_B) \cdot 1^{(k)}]\right]_\Lambda,$$

where the brackets with subscript $[\ ]_\Lambda$ indicate a modulo operation, and where $\Lambda$ is a spatial length of a pseudorandom code identifying the particular satellite k being re-acquired. In addition, the unit vector pointing from $x_A$ to the position of satellite k is represented as $1^k$.

The determined frequency at the re-acquiring navigation module $\hat{f}$ is given by the relative velocity of the re-acquiring module and the occluded satellite k. Given the position $x_B$ and velocity $v_B$ of the aiding navigation module and the position $\hat{x}_A$ and velocity $\hat{v}_A$ of the re-acquiring navigation module, as well as the frequency of the navigation signal at the aiding module $f_B$, the acquisition frequency includes $$\hat{f} = f_B + \frac{(v_A - v^{(k)}) \cdot 1^{(k)}}{\lambda}\left[2\sin\left(\frac{\delta\theta}{2}\right)\sin(\theta + \delta\theta)\right].$$

Here, $\theta$ is the angle between the relative velocity between the aiding navigation module and satellite k, and $\theta+\delta\theta$ is the angle between the velocity of the reacquiring navigation module and the satellite velocity. In this embodiment, geographic aiding can enable smooth tracking of multiple occluded satellite signals in cluttered environments, as long as at least one receiver is able to track enough signals at any given point in time to compute position and velocity.

Figure 6:
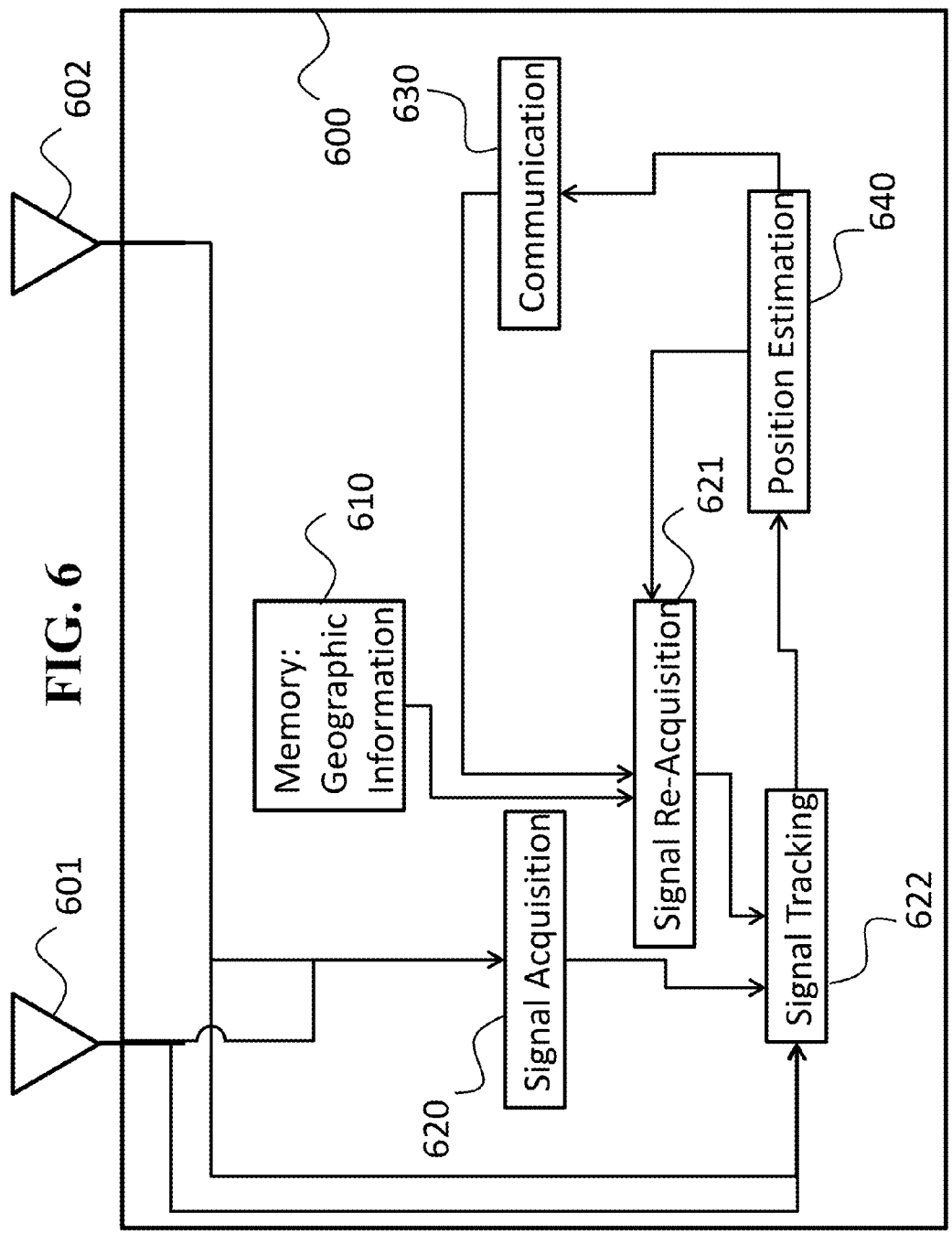
FIG. 6 a diagram of the different components of a navigation module according to some embodiments of the invention.

FIG. 6 shows a navigation module 600 with one or more antennas 601 and 602 according to some embodiments of the invention. The navigation module 600 can process navigation signals using a signal acquisition module 620 for initial acquisition of navigation signals to be processed in the signal tracking module 622. In the case of navigation signal outage and loss of position estimates, the reacquisition module 621 resorts to the information from the geographic information module 610 to estimate the current position and velocity of the navigation module 600.

The geographic information module 610 includes information about the geometry of the train tracks, and properties, e.g., locations and/or dimensions, of other geographic features, such as buildings, tunnels, lighting poles, and train stations. The communication module 630 transmits information to other navigation modules and receives information from other navigation modules and/or other types of sensors, such as velocity sensors. The signal reacquisition module 621 combines the information received from other navigation modules through the communication module 630 with any other available information, such as velocity measurements also provided through the communication module 630 or position estimates when available from the position estimation module 640. The information combined at the reacquisition module is processed to determine the frequency and the phase of the satellite signals, otherwise determined by the acquisition module 620 after cumbersome computations.

Some embodiments of the invention are based on realization that in a navigation system where geographic information is available, for example in the form of a GIS database, previous position and velocity estimates can be used to yield estimates of position and velocity in real time, or even predict position and velocity into the future. For example, after losing the signal due to an occluding geographical object, the position and/or velocity at the next LOS location can be predicted using geographical information (GI) about the properties of that object. For example, when a vehicle enters a tunnel that blocks the satellites signals, the geometry of the tunnel can be used to predict the position of re-emerging from such a tunnel and the knowledge of that position can be used to initiate the tracking of the satellite signal.

Figure 7:
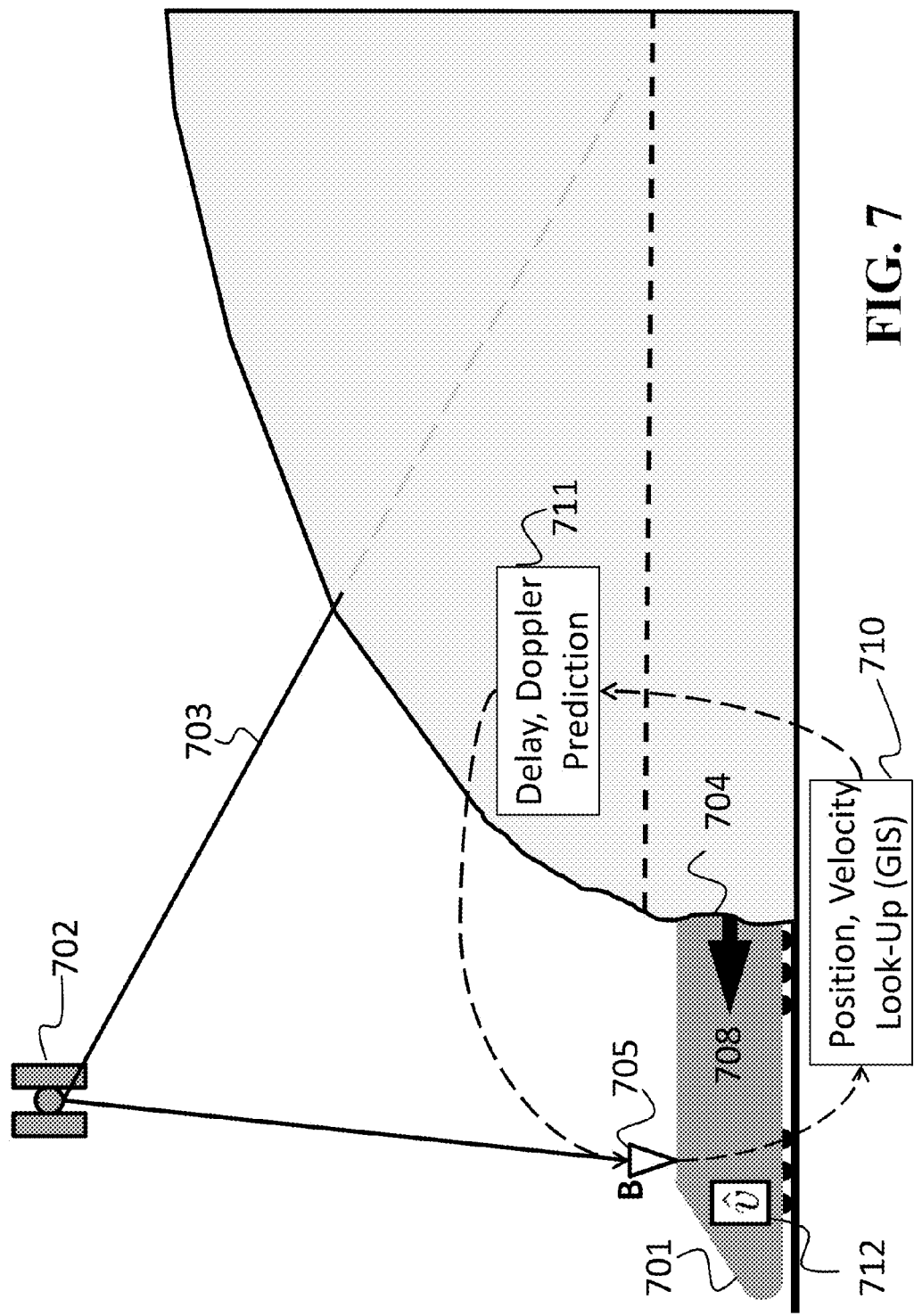
FIG. 7 is an illustration of a train exiting an area denied of navigation coverage with a known exit point.

FIG. 7 shows an embodiment of the invention, where a train 701 is exiting a tunnel where the signals 703 are occluded. Upon entering the tunnel, the system can estimate the exit location 704 using the GIS database 710 and determine the phase of the satellite signal at that location 704. Using velocity measurements from velocity sensor 712, the velocity 708 can be estimated, yielding the expected signal frequency caused by the Doppler Effect 711 for each satellite 702 at the navigation antenna and module 705.

For example, at the tunnel exit location $\hat{x}_A$, the train traveling at velocity $\hat{v}_A$ detects the satellite signal from satellite k at the frequency $\hat{f}$:

$$\hat{f}^{(k)} = \frac{(v_u - v^{(k)}) \cdot 1^{(k)}}{\lambda} + f_0$$

$$1^{(k)} = \frac{x_u - x^{(k)}}{\|x_u - x^{(k)}\|}$$

The unit vector pointing from $x_A$ to the position of satellite k denoted by $x^{(k)}$ is represented as $1^k$, $v^{(k)}$ is the velocity of the satellite k, and $\|\cdot\|$ denotes a vector norm, and $f_0$ is the frequency of the satellite signal.

The expected phase $\hat{\Phi}$ of the satellite signal is:

$$\Phi = \left[\frac{1}{c}\left[\|x^{(k)} - x_u\| - (b^{(k)} - \hat{b}_A)\right] + A_1 f_{Dopp} + A_{0\varphi}\right]_\Lambda,$$

wherein c is the speed of light, $\hat{b}_A$ is the clock bias on the navigation module A, and $b^{(k)}$ is the bias on the clock of satellite k, the Doppler frequency $f_{Dopp}$ is the difference between the nominal signal frequency and the actual frequency of the received signal, co is the phase of the signal carrier; $A_0$ and $A_1$ are receiver dependent constants. The brackets with subscript $[\ ]_\Lambda$ indicate the modulo operation, and where Λ is the spatial length of a pseudorandom code identifying the particular satellite k being re-acquired.

In another embodiment of the invention, the signals can be reacquired without standalone navigation position or velocity estimations. Knowing that the vehicle has entered a geographic feature in which navigation signal reception is poor, such as a tunnel or an urban canyon, it is possible to compute a point of reemergence from this feature. In such a case, geographic information about the track can be used to initialize the phase search and when speed measurements are available from other on-board sensors, the frequency can be estimated to complete the reacquisition process.

Figure 8:
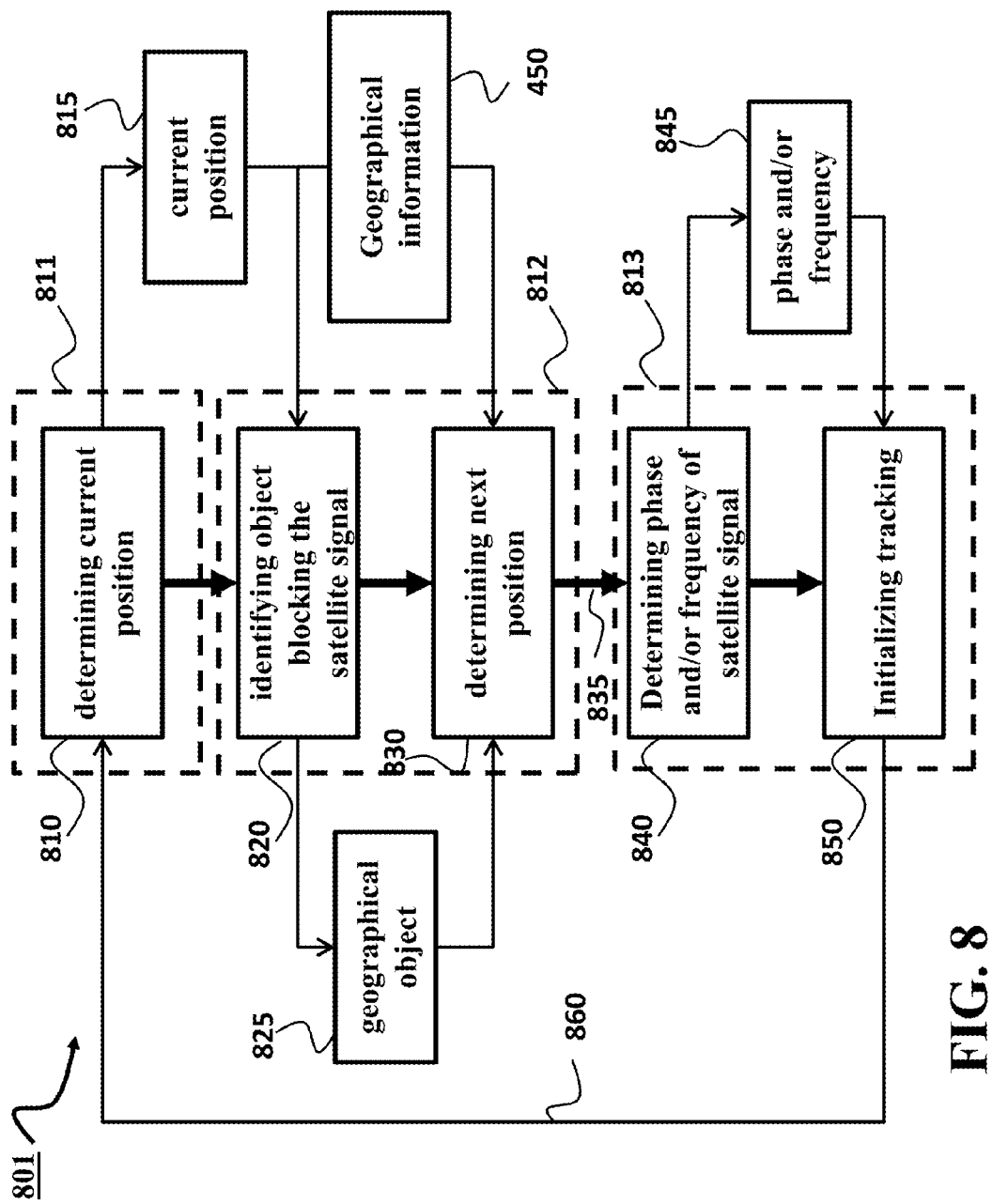
FIG. 8 is a block diagram of a navigation system for tracking a satellite signal according to one embodiment of the invention.

FIG. 8 shows a block diagram of a navigation system for tracking a satellite signal according to one embodiment of the invention. The navigation system can be installed on the vehicle and be communicatively connected to sensors of the vehicle, such as a velocity sensor. The modules of the navigation system can be implemented using at least one processor, e.g., a processor 801 of the navigation system optionally assisted by other processors arranged in the vehicle. The processor 801 is operatively connected to a non-transitory memory storing a database 450 of geographical information.

The navigation system includes a position module 811 for determining 810 a current position 815 of the vehicle by tracking at least one satellite signal. The navigation system also includes an estimation module 812 for identifying 820, e.g., upon an interruption of the tracking the satellite signal, a geographical object 825 blocking the satellite signals. The estimation module 812 is also configured for determining 830 a next position 835 of the vehicle at a distance from the current position at which the navigation system reacquires the satellite signal. For example, the estimation module can determine the next position using a property of the geographical object, such as height and/or width of the object, such as a building, or other dimensions of the object, such as a length of a tunnel.

The navigation system also includes an acquisition module 813 for determining a phase 845 of the satellite signal at the next position and for initializing 850, e.g., upon reacquiring the satellite signal, the tracking of the satellite signal using the phase. In some embodiments, the acquisition module also determines 840 a frequency 845 of the satellite signal using a velocity of the vehicle determined by a measurement system of the vehicle and initializes 850 the tracking of the satellite signal using the phase and the frequency of the satellite signal.

Figure 9:
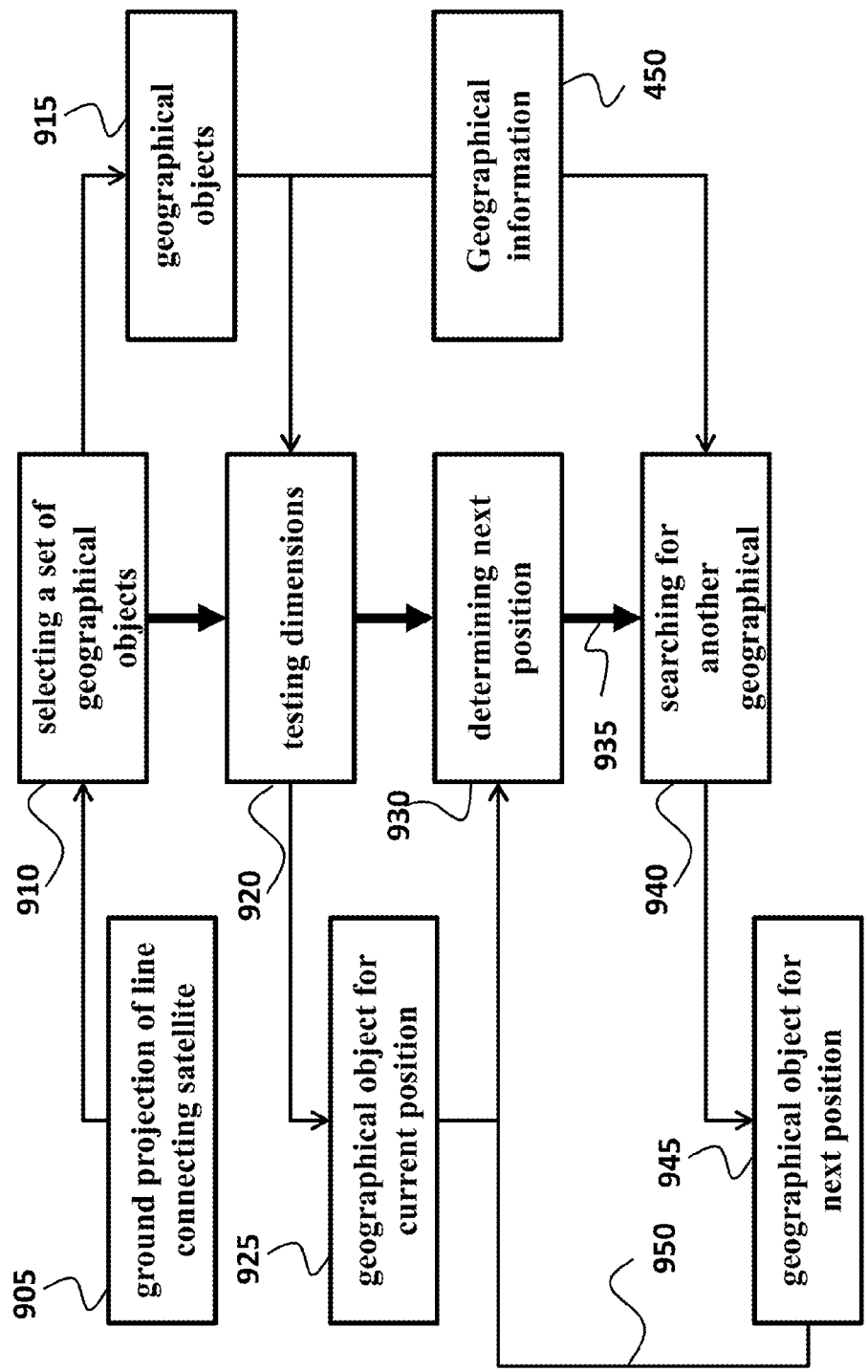
FIG. 9 is a block diagram of a method for identifying the object blocking the satellite signal according to some embodiments of the invention.

FIG. 9 shows a block diagram of a method for identifying the object blocking the LOS with the satellite and for determining the next LOS position according to some embodiments of the invention. The method selects a set of objects, using the geographical information 450 that can potentially block the satellite signal. For example, the method selects 910 a set of geographical objects 915 in proximity with the current position of the navigation system and located on a ground projection 905 of a line connecting the satellite with the navigation system. The method tests 920 the dimensions of each geographical object in the set adjusted with corresponding distances to the current position of the navigation system to identify the object blocking the satellite signal and determines the next position as a first position having a line-of-sight with the satellite with respect to the object.

Some embodiments are based on a realization that the signal at the next position determined for the method can be also blocked by another objects not selected in the set 915. Accordingly some embodiments search 940 for another geographical object 945 blocking the satellite signal at the next position and update iteratively a location of the next position until the next position has a line-of-sight with the satellite.

The above-described embodiments of the present invention can be implemented in any of numerous ways. For example, the embodiments may be implemented using hardware, software or a combination thereof. When implemented in software, the software code can be executed on any suitably programmed processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A navigation system, comprising:
   a first navigation module for determining a first position; and
   a second navigation module for determining a second position, wherein the first and the second navigation modules are mechanically connected, such that the first position is dependent on the second position, wherein the first and the second navigation modules are communicatively connected to exchange information including at least one of the first and the second positions, and wherein, at an instant of time during an operation of the navigation system, the first navigation module receives the second position from the second navigation module and determines the first position based on the second position, wherein the first navigation module determines a first velocity and determines the first position based on the first velocity and the second position, and wherein the first navigation module determines a phase of a satellite signal using the first position determined upon receiving the second position, determines a frequency of the satellite signal using the first velocity, and initializes tracking of the satellite signal according to the frequency and the phase of the satellite signal.

2. The navigation system of claim 1, wherein the first navigation module receives a second velocity from the second navigation module and determines the first velocity using the second velocity.

3. The navigation system of claim 1, wherein the first navigation module determines the first position using a relative velocity between the first and the second navigation modules.

4. The navigation system of claim 1, wherein the first navigation module receives the first velocity from a velocity measurement system rigidly connected with the first navigation module.

5. The navigation system of claim 1, wherein the first navigation module determines the first position using a relative distance between the first and the second navigation modules.

6. The navigation system of claim 5, wherein the first navigation module and the second navigation module are rigidly connected.

7. The navigation system of claim 5, wherein the first navigation module adjusts the relative distance using geographic information.

8. The navigation system of claim 5, wherein the first and the second navigation modules are arranged at different cars of a train and connected by the cars of the train, wherein the first navigation module adjusts the relative distance using information about the connection between the cars, and geographic information.

9. The navigation system of claim 1, wherein the first navigation module determines the phase $\hat{\Phi}$ of the satellite signal according to $$\hat{\Phi} = \left[\frac{1}{c}\left[\|x^{(k)} - x_u\| - (b^{(k)} - \hat{b}_A)\right] + A_1 f_{Dopp} + A_0 \varphi\right]_\Lambda,$$

wherein $\hat{x}_A$ is the first position of first navigation module A, $x^{(k)}$ is a position of a satellite k transmitting the satellite signal, c is the speed of light, $\hat{b}_A$ is a clock bias on the first navigation module A, $\varphi$ is the phase of the satellite signal, $A_0$ and $A_1$ are receiver dependent constants, and $b^{(k)}$ is a bias on the clock of the satellite k, brackets with subscript $[\ ]_\Lambda$ indicate the modulo operation, and $\Lambda$ is a spatial length of a pseudorandom code identifying the satellite k being re-acquired, wherein the first navigation module determines the frequency $\hat{f}$ of the satellite signal according to $$\hat{f}^{(k)} = \frac{(v_u - v^{(k)}) \cdot 1^{(k)}}{\lambda} + f_0$$

$$1^{(k)} = \frac{x_u - x^{(k)}}{\|x_u - x^{(k)}\|},$$

wherein $\hat{v}_A$ is the first velocity of the first navigation module, $v^{(k)}$ is a velocity of the satellite k, and $\|\cdot\|$ denotes a vector norm, and $1^k$ is a unit vector pointing from the first position $x_A$ to the position $x^{(k)}$ of satellite k, and $f_0$ is a frequency of the satellite signal.

10. The navigation system of claim 1, wherein the first navigation module comprises:
at least one communication module for exchanging the information between the first and the second navigation modules;
a memory for storing information indicative of a relative distance between the first and the second navigation modules;
a position estimation module for determining the first position by tracking at least one satellite signal; and
a signal acquisition module for tracking of the position estimation module according to the frequency of the satellite signal.

11. The navigation system of claim 10, wherein a portion of the information includes one or combination of the second position and a second velocity of the second navigation module, wherein the signal acquisition module determines the first velocity and the first position using the second velocity, the second position and a relative distance between the first and the second navigation modules.

12. The navigation system of claim 11, wherein the memory stores geographical information, wherein the information indicative of the relative distance include a maximal relative distance, and wherein the signal acquisition module determines the relative distance between the first and the second navigation modules using the geographical information and the maximal relative distance.

13. A method for navigating a vehicle, comprising:
tracking, by a first navigation module installed on the vehicle, a set of satellite signals to determine a first position;
receiving, upon loosing at least one satellite signal, a second position determined by a second navigation module installed on the vehicle, such that the second navigation module is mechanically connected with the first navigation module through a body of the vehicle;
determining the first position based on a relative distance between the first and the second navigation modules and a velocity of the vehicle;
determining a phase of the satellite signal using the first position determined upon receiving the second position;
determining a frequency of the satellite signal using the velocity; and
initializing the tracking of the satellite signal according to the frequency and the phase of the satellite signal.

14. The method of claim 13, wherein the vehicle is a train traveling on a train track, further comprising:
selecting a portion of the train track including the second position from a geographical information database; and
determining the first position by projecting the relative distance along the portion of the train track starting from the second position into a direction of the velocity.

15. A navigation system of a train moving on a train rack, comprising:
a first navigation module installed on the train for determining a first position of the train; and
a second navigation module installed on the train for determining a second position of the train, wherein the first and the second navigation modules are mechanically connected through a body of the train and are communicatively connected to exchange operational information; and
a non-transitory memory storing a database with geographical information including information on the train rack, wherein the first and the second navigation modules are configured to determine at least one of the first and the second position using the geographical information and the operational information, wherein the first navigation module determines a first velocity and determines the first position based on the first velocity and the second position, and wherein the first navigation module determines a phase of a satellite signal using the first position determined upon receiving the second position, determines a frequency of the satellite signal using the first velocity, and initializes tracking of the satellite signal according to the frequency and the phase of the satellite signal.

16. The navigation system of claim 15, wherein, at an instant of time during an operation of the navigation system, the first navigation module receives the second position from the second navigation module and determines the first position based on the second position, a portion of a train track including the second position, and a velocity of the train by projecting a relative distance between the first and the second navigation modules along the portion of the train track starting from the second position into a direction of the velocity.

17. The method of claim 15, wherein the operational information includes one or combination of a position of the second navigation module, a phase of a satellite signal, a frequency of the satellite signal, wherein the first navigation module determines the phase and the frequency of the satellite signal using the operational information and initializes the tracking of the satellite signal according to the frequency and the phase of the satellite signal.

* * * * *